Patented Oct. 18, 1938

2,133,728

UNITED STATES PATENT OFFICE 2,133,728

COLORED ROOFING GRANULES AND METHOD OF MANUFACTURING THE SAME

Paul Teetor, Poultney, Vt., assignor to Central Commercial Company, a corporation of Illinois No Drawing. Application February 20, 1935, Serial No. 7,431

9 Claims. (Cl. 91—70)

This invention relates to composition roofing and, more particularly, to colored granules for use on composition roofing and to the process of attaching the color pigment to the surface of the granule.

One of the objects of the invention is the provision of new and improved colored granules for use on composition roofing.

Another object of the invention is the provision of a new and improved process for attaching color pigment to the surface of granules and other building material.

A further object of the invention is the provision of new and improved roofing granules having color material permanently attached to the surface thereof; granules that may be prepared at a minimum of time and expense; that may have various shades and tints as may be desired, and that will retain the brilliancy of their color under varying climatic conditions.

It is common practice in the manufacture of composition roofing to employ a foundation felt impregnated with a bituminous composition, cover the same with a coat of asphaltic compound of relatively high melting point, or the like, and partially embed in the surface of the outer coating while the same is plastic a coat of granules of some natural color or of granules artificially colored. The former are often unsatisfactory because of the lack of brilliancy and permanency in the colors which are available for commercial use. It has been proposed to color granules by attaching color pigment to the surface of the granules by a binder of water glass or the like. This type of granule, for the most part, has also been unsatisfactory because the binder is more or less affected by the mechanical action of the wind and rain, and being more or less soluble the color pigment in time is released and is blown off by the wind or washed away by rain or water.

The present invention seeks to remedy these defects by the provision of a binder for attaching color pigment to the surface of granules which is insoluble and which is highly weather resistant.

In the present invention, the binder, after being mixed with the color pigment, is glazed or fused onto the surface of the granules. The material of the binder is an insoluble phosphate or phosphates of one or more of the metals, including those of the calcium group (barium, strontium and calcium), as, for instance, the phosphates of zinc, iron, aluminum, magnesium, chromium, copper, cobalt, uranium, titanium, antimony, manganese, cadmium, lead, nickel, and the like.

In practice, the compounds of the metals are reduced to a finely divided state, and after being mixed with the color pigment and granules, the mass is treated with a solution of a soluble phosphate, as, for instance, hydrogen phosphate (phosphoric acid), sodium phosphate, potassium, phosphate or the like to form an insoluble coating on the granule.

Preferably, phosphoric acid ($H_3PO_4$), instead of other soluble phosphates, is employed, as, otherwise, there will be soluble compounds formed in addition to the insoluble phosphates, thereby necessitating washing the reaction products to remove the soluble matter which would add to the cost of the process on account of this additional treatment.

Sufficient water is included to form a pasty material of suitable working consistency and the mass thoroughly mixed in any suitable manner, as in a mixing machine.

The granules after being treated are subjected to a heat treatment sufficient to not only dry the binder on the granules, but also to fuse the same thereon, whereby a glaze is formed that firmly and permanently binds the color pigment to the surface of the granule. The drying operation is performed by any suitable mechanism, as for instance in a rotary kiln.

The oxides of metals may be used. In certain cases, it may be desirable or less expensive to use the hydroxides or carbonates of the metals, as, for instance, those of the calcium group, magnesium, and the like.

Under certain conditions, as when a particular color tint is desired, color pigment in sufficient quantity to react on the acid with additional pigment to properly color the glaze is employed without any additional material. In fact, phosphoric acid alone with color pigment will form a glaze on slate and other granules. Likewise, phosphoric acid and ocher or slate flour will form a glaze for coloring granules.

The following schedule or table of glaze materials, color pigment and phosphates for each ton of granules is given by way of example as producing satisfactory results for a green glaze:—

|  | Pounds | Usual, pounds |
|---|---|---|
| Phosphoric acid 75% | 10-80 | 40 |
| Zinc oxide | 0-25 | 4 |
| Magnesium carbonate | 0-25 | 15 |
| Barium carbonate | 0-25 | 0 |
| Calcium carbonate | 0-25 | 0 |
| Chrome oxide | 10-25 | 18 |

Different color pigments may be used for securing the different colors, as, for instance, the oxides of iron, cobalt, chromium, and the like. Different color tints and various other characteristics of the cement may be obtained by combining the various compositions in different groups and proportions.

In the preparation of colored granules, a mixture of phosphoric acid, color pigment and the compounds of one or more of the metals enumerated above, together with sufficient water to make a good working consistency, is applied to the surface of the granules in any suitable manner, as by subjecting the mass to the operation of a mechanical mixer. After the mass has been thoroughly mixed, the same is subjected to a temperature sufficient to form a glaze on the surface of the granule and simultaneously agitating the mass to prevent agglomeration. This temperature will vary with the material employed, but usually it varies from about 800° F. to 1600° F.

The following formula gives a satisfactory green glaze at a fusing temperature from 1000° to 1200° F.:—

|  | Pounds |
|---|---|
| Phosphoric acid 75% | 40 |
| Chrome oxide | 18 |
| Zinc oxide | 4 |
| Magnesium carbonate | 15 |
| Water | 60 |

Various tints and shades of color may be obtained for the granules by the use of the different compounds, taken singly or taken with one or more of the other compositions.

Not only may various shades and tints of colors be obtained by employing different groups of these compounds but other and different properties and characteristics will result in the finished product. The elements of the compounds that are the most practical for use in commercial production are to be found in Group II and in period 4 (series 4 and 5) of the periodic classification of the elements as given under periodic table in Webster's "New International Dictionary" which comprises magnesium, zinc, strontium, barium, iron, cobalt, nickel, chromium, and titanium. The compounds of potassium of period 4 are not suitable because they do not form insoluble phosphates with phosphoric acid.

It is thought from the foregoing that my process will be apparent to those skilled in the art, and that changes therein may be made without departing from the spirit and scope of the appended claims.

I claim as my invention:—

1. A granule for use on composition roofing comprising a body portion of mineral matter, a fused coat of phosphate material consisting of a phosphate of the alkaline earth metals substantially enveloping said body portion, and color pigment incorporated in said fused coat.

2. A granule adapted to be used on composition roofing comprising a body portion of mineral matter, a fused coat of mineral matter having color pigment incorporated therein substantially enveloping said body portion, said last-named mineral matter consisting of phosphate material comprising at least one insoluble phosphate of the metals of Group II of the periodic classification of the elements.

3. A granule adapted to be used on composition roofing comprising a body portion of mineral matter, a fused coat of mineral matter having color pigment incorporated therein substantially enveloping said body portion, said mineral matter consisting of phosphate material at least one of which is an insoluble phosphate of the metals of period 4 of the periodic classification of the elements.

4. A process of coloring granules which comprises mixing the granules with color pigment, and a cementitious material, said material consisting of phosphoric acid and a compound on which phosphoric acids will react to form an insoluble phosphate for attaching said color pigment to the surface of said granules, and then fusing said insoluble phosphate onto the surfaces of the granules.

5. A method of coloring granules suitable for use on composition roofing which comprises mixing the granules with coating materials consisting of phosphate material formed by the reaction of phosphoric acid and at least one of the elements of Group II of the periodic classification of the elements, and then fusing the phosphate material only onto the surface of the granule.

6. A method of coloring granules suitable for use on composition roofing which comprises mixing the granules with color pigment and coating materials, said materials consisting of phosphoric acid, water and aluminum oxide, and then fusing the coating material onto the surface of said body portion.

7. Roofing material comprising felt impregnated with bituminous composition and colored granules secured to one surface of said felt by said composition, each of said granules being covered by cementitious material consisting of an insoluble phosphate that has been fused thereon and containing color pigment interspersed therein.

8. Composition roofing comprising a strip of felt impregnated with a bituminous composition, and having artificially colored granules secured to one side thereof by an asphaltic binder, each granule having color pigment attached thereto solely by an insoluble phosphate fused thereon.

9. Roofing material comprising lengths of felt impregnated with a bituminous composition and having granules of mineral matter secured thereon, each granule having color pigment secured to the surface thereof by a binder fused thereon, said binder consisting of the reaction product of phosphoric acid and a compound of one of the metals of family a of Group II of the periodic classification of the elements.

PAUL TEETOR.